(12) United States Patent
Cohen et al.

(10) Patent No.: US 6,231,980 B1
(45) Date of Patent: May 15, 2001

(54) BX CY NZ NANOTUBES AND NANOPARTICLES

(75) Inventors: Marvin Lou Cohen, Piedmont; Alexander Karlwalter Zettl, Kensington, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 08/978,435

(22) Filed: Nov. 25, 1997

Related U.S. Application Data

(63) Continuation-in-part of application No. 08/388,494, filed on Feb. 14, 1995, now abandoned.

(51) Int. Cl.$^7$ ...................................................... B32B 5/16
(52) U.S. Cl. ......................... 428/402; 428/408; 423/276; 423/290; 423/291; 423/351; 423/364; 423/371; 423/414; 423/439
(58) Field of Search ................................. 428/402, 408; 423/276, 290, 291, 364, 371, 414, 445 R, 351, 406, 439

(56) References Cited

U.S. PATENT DOCUMENTS

| | | | |
|---|---|---|---|
| 5,456,986 | * 10/1995 | Majetich et al. | 428/403 |
| 5,549,973 | * 8/1996 | Majetich et al. | 428/403 |
| 5,780,101 | * 7/1998 | Nolan et al. | 427/216 |

OTHER PUBLICATIONS

Miyamoto, et al., Physical Review B, vol. 50, No. 24, "Electronic properties of tubule forms of hexagonal $BC_3$", pp. 18360–18366, 12/94.

Rubio, et al., Physical Review B, vol. 49, No. 7, "Theory of graphite boron nitride nanotubes" pp. 5081–5084, 2/94.

Hamada, et al., Physical Review Letters, vol. 68, No. 10, "New One–Dimensional Conductors: Graphite Microtubules", pp. 1579–1581, 3/92.

Dresselhaus, Solid State Communications, vol. 84, Nos. 1/2, "$C_{60}$ Related Tubules", pp. 201–205, 1992.

S. Ijima (Nature, 354:56, 1991).

T.W. Ebbessen and P.M. Ajayan (Nature, 358:220, 1992).

E.L.M. Hamilton, et al, Science, 260:659, 1993.

Weng–Sieh, et al., Phys Rev B, 51(16):11229, 1995.

N.G. Chopra, et al., Science, 269: 967, Aug. 18, 1995.

\* cited by examiner

*Primary Examiner*—H. Thi Le
(74) *Attorney, Agent, or Firm*—Coudert Brothers

(57) ABSTRACT

The invention provides crystalline nanoscale particles and tubes made from a variety of stoichiometries of $B_xC_yN_z$ where x, y, and z indicate a relative amount of each element compared to the others and where no more than one of x, y, or z are zero for a single stoichiometry. The nanotubes and nanoparticles are useful as miniature electronic components, such as wires, coils, schotky barriers, diodes, etc. The nanotubes and nanoparticles are also useful as coating that will protect an item from detection by electromagnetic monitoring techniques like radar. The nanotubes and nanoparticles are additionally useful for their mechanical properties, being comparable in strength and stiffness to the best graphite fibers or carbon nanotubes. The inventive nanoparticles are useful in lubricants and composites.

36 Claims, 2 Drawing Sheets

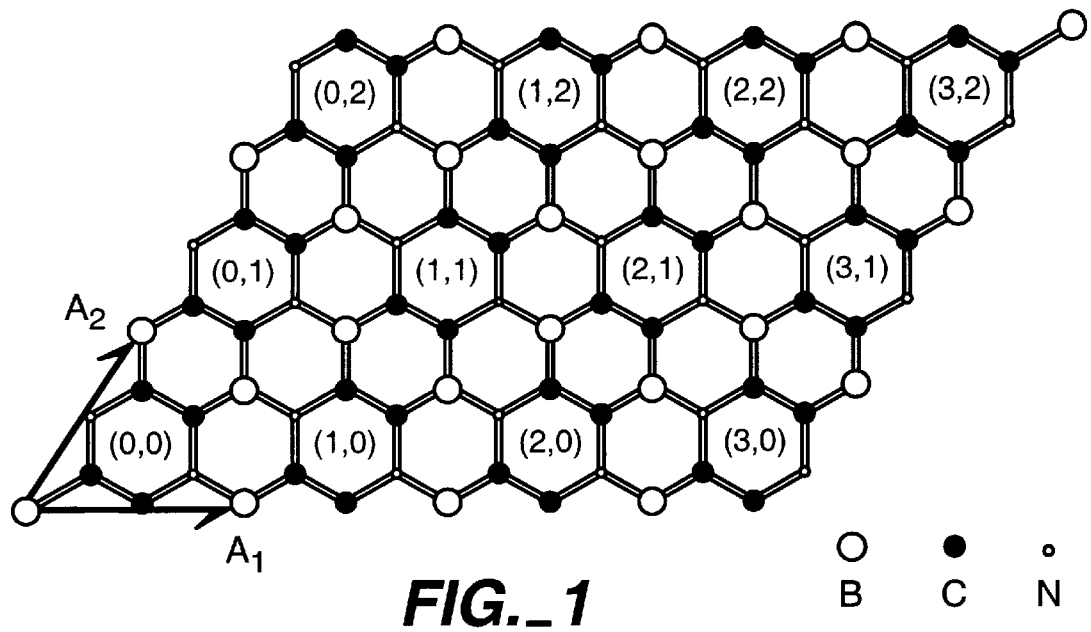
FIG._1
O B  ● C  ∘ N
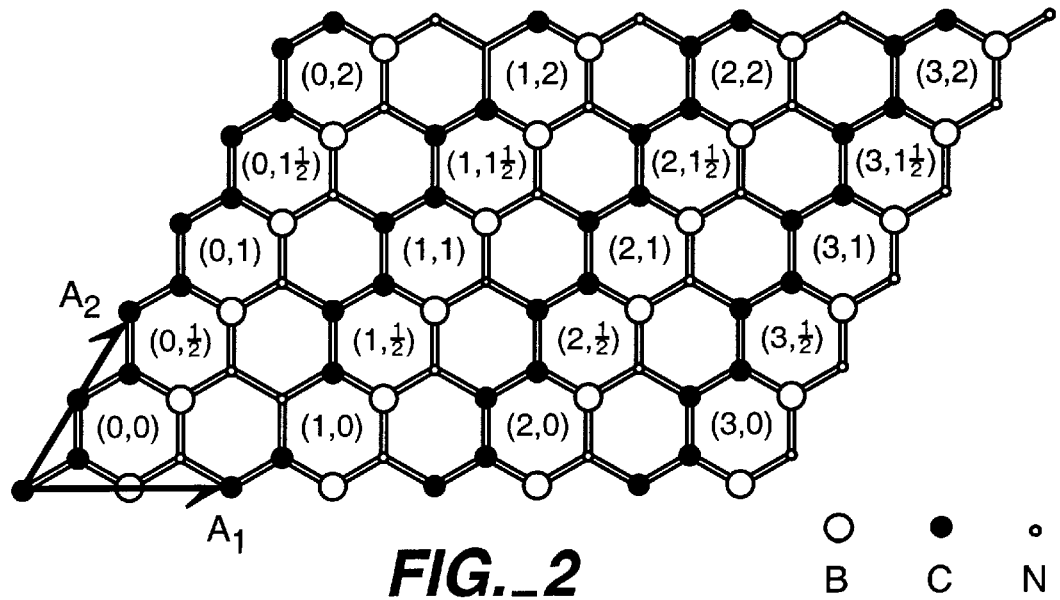
FIG._2
O B  ● C  ∘ N

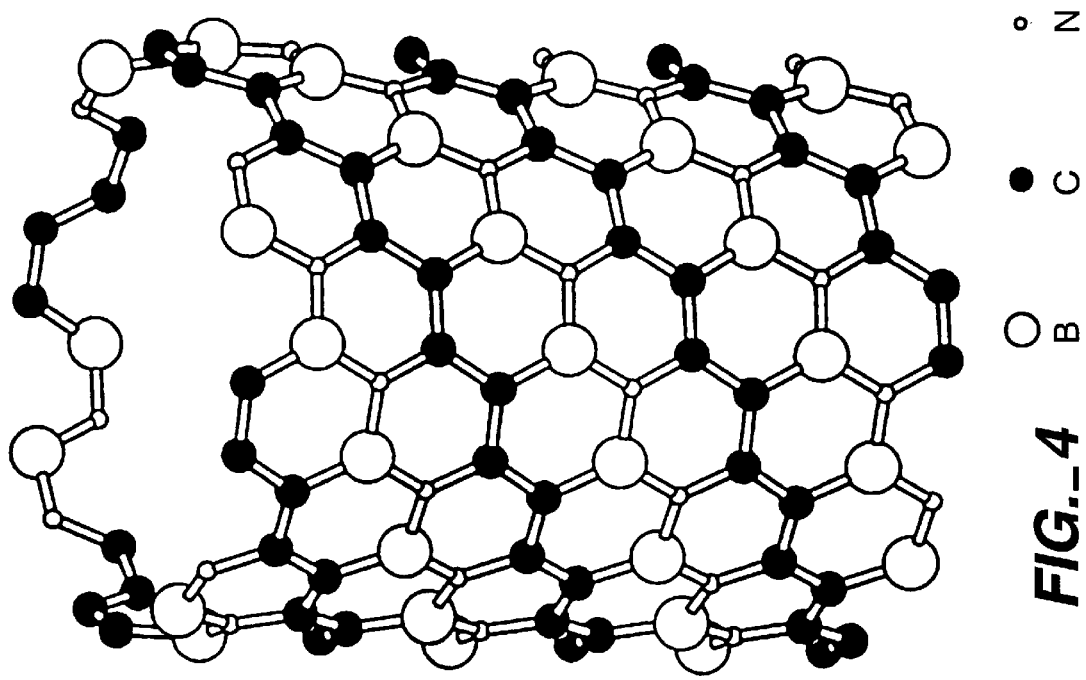
FIG._4
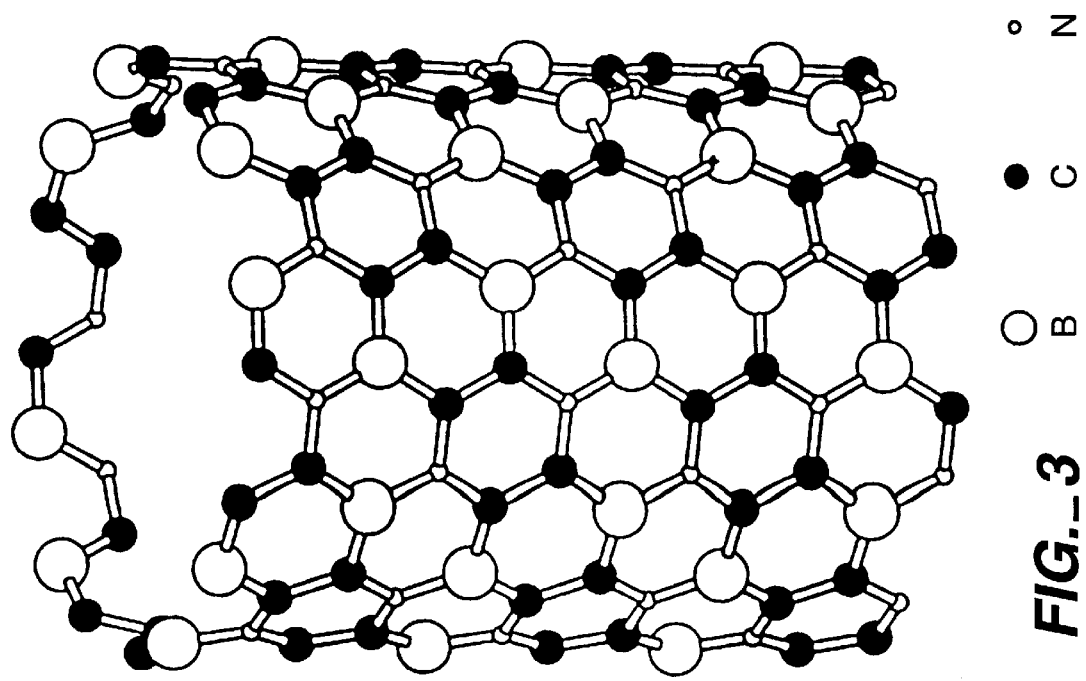
FIG._3

BX CY NZ NANOTUBES AND NANOPARTICLES

This application is a continuation-in-part of application Ser. No. 08/388,494, filed Feb. 14, 1995 incorporated herein by reference, now abandoned.

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

I. BACKGROUND OF THE INVENTION

1. Field of the Invention

This invention relates generally to nanotubes and nanoparticles and more specifically to nanotubes and nanoparticles containing boron, carbon and nitrogen.

2. Description of Related Art

Carbon nanotubes were discovered by S. Ijima (Nature, 354:56, 1991) and synthesized by T. W. Ebbesen and P. M. Ajayan (Nature, 358:220, 1992). Theoretical studies by N. Hamada, et al. (Phys. Rev. Lett., 68:1579, 1992) and M. S. Dresselhaus, et al. (Solid State Commun., 84:201, 1992) showed that carbon nanotubes exhibit either metallic or semiconducting behavior depending on the radii and helicity of the tubules. Hamada proposed a notation to classify the helicity using the indices (n,m). The (n,m) tubule is obtained by rolling a planar graphite sheet so that a first hexagonal carbon ring on one edge of the sheet will connect with a second hexagonal carbon ring, which in the planar configuration was separated from the first ring by $nA_1 + mA_2$; where $A_1$ and $A_2$ are primitive translation vectors on the graphite sheet.

The carbon nanotubes have interesting and potentially useful electronic and mechanical properties. Among the barriers to actualizing the utility of carbon nanotubes are nonuniform electronic properties resulting from small band gaps.

A turbostratic tubular form of boron nitride (BN) having a diameter on the order of 1 to 3 micrometers was produced from the amorphous phase of BN (E. J. M. Hamilton et al., Science, 260:659, 1993). Hamilton's micron-scale, amorphous phase, BN tubes are characterized by a random, non-crystalline arrangement of atoms in the wall of the tube; the atomic arrangement does not map back on itself. Limitations of BN amorphous phase tubes, not having a high degree of crystallinity in the tube walls, include reduced mechanical strength, and ill-defined and unpredictable electronic properties, compared to tubes having a crystalline structure. Another characteristic of Hamilton et al.'s amorphous BN tubes is their size, on the order of 1000 times larger than nanoscale structures. Because BN is not an electrical conductor Hamilton et al. synthesized their amorphous micron-scale tube using a high temperature gas reaction instead of an arc system.

Theoretical studies by N. Hamada, et al. (Phys. Rev. Lett., 68:1579, 1992) and M. S. Dresselhaus, et al. (Solid State Commun., 84:201, 1992) showed that carbon nanotubes exhibit either metallic or semiconducting behavior depending on the radii and helicity of the tubules. Hamada proposed a notation to classify the helicity using the indices (n,m). The (n,m) tubule is obtained by rolling a planar graphite sheet so that a first hexagonal carbon ring on one edge of the sheet will connect with a second hexagonal carbon ring, which in the planar configuration was separated from the first ring by $nA_1 + mA_2$; where $A_1$ and $A_2$ are primitive translation vectors on the graphite sheet.

Carbon nanotubes have small bandgaps that make their electronic properties nonuniform. In addition, the bandgap of a carbon nanotube is relatively sensitive to tube diameter, helicity, and multiplicity of walls. Furthermore, it is difficult to dope carbon nanotubes, that is to add small concentrations of non-carbon material to the tubes. Typically doping occurs at concentrations of about 1% or less.

II. SUMMARY OF THE INVENTION

Inventive nanoscale tubes ("nanotubes") and nanoscale particles ("nanoparticles") having crystalline walls were formulated comprising a variety of stoichiometries of $B_xC_yN_z$. Typically x, y, and z are integers including zero, where no more than one of x, y, and z are zero for a given stoichiometry. The x, y, and z subscripts indicate the relative proportion of each element with respect to the others. For example, y may be zero yielding the formula $B_xN_z$; z may be zero yielding the formula $B_xC_y$; or x may be zero yielding the formula $C_yN_z$. In the circumstances that the inventive $B_xC_yN_z$ structures are doped with added elements or molecules, the subscripts x, y, and z will take on non-integer values. In general, it is not necessary that x, y, and z are integers. Since they indicate ratios, they may or may not be expressed as integers.

The inventive nanotubes and nanoparticles comprise carbon combined with boron and/or nitrogen. In a different embodiment, the inventive nanotubes and nanoparticles comprise essentially only boron and nitrogen. The inventive nanotubes and nanoparticles can be doped with other elements or molecules to alter their electronic properties. Examples of doping elements are boron, carbon, nitrogen, aluminum, silicon, phosphorous, beryllium, oxygen, and any of the alkali atoms. Examples of doping molecules are methyl or butyl groups and osmium tetroxide. There are several other possible elements and compounds that will be readily known by those skilled in the art. Typically the concentration of dopants is less than 1%.

III. SUMMARY DESCRIPTION OF THE DRAWINGS

FIG. 1: shows a planar Type I arrangement of boron, carbon, and nitrogen atoms where the bond angles are 120°. Primitive vectors $A_1$ and $A_2$ are shown at the lower left-hand corner of the sheet; lattice indices (n,m) are shown at the center of each unit cell.

FIG. 2: shows a planar Type II arrangement of boron, carbon, and nitrogen atoms where the bond angles are 120°±2°. Primitive vectors $A_1$ and $A_2$ are shown at the lower left-hand corner of the sheet; lattice indices (n,m) are shown at the center of each unit cell.

FIG. 3: shows a nanotube having indices (4,4) rolled from the type-I sheet shown in FIG. 1.

FIG. 4: shows a nanotube having indices (4,4) rolled from the type-II sheet shown in FIG. 1.

IV. DETAILED DESCRIPTION OF THE INVENTION

The present invention comprises nanoscale tubes and nanoparticles made essentially from carbon combined with boron and/or nitrogen. In a different embodiment, the inventive nanotubes and nanoparticles comprise essentially only boron and nitrogen.

To understand the structure of the nanotubes and nanoparticles it is useful to consider a theoretical model comprising a two-dimensional planar arrangement, or sheet, of atoms that is rolled to form a tube. In a theoretical model atoms of boron, carbon, and nitrogen are arranged in a honeycomb lattice of hexagonal rings. The sheet is rolled up and spliced together to form a tube. That is, the tube is a conformal mapping of the two dimensional sheet onto the surface of a cylinder. The two-dimensional lattice sheet can be rolled many different ways to form a tube. The nanotube index describes how a sheet is rolled into the tube. A special circumference vector is related to the number of adjacent hexagonal carbon rings that are traversed when tracing the tube circumference once, and the amount the lattice is skewed when it is rolled. The lattice vector, A, is made up of two component vectors, $A_1$ and $A_2$, where $A=nA_1+mA_2$ with n and m half-integers, integers, or zero. The extent of helicity in the nanotube is noted by using the indices (n,m).

The nanotube index (n,m) is described in detail by C. T. White et al. *"Predicting Properties of Fullerenes and their Derivatives"*, Chapter 6, page 159 and following, in *Buckminsterfullerenes*, W. E. Billups, and M. A. Ciufolini, ed. (New York: VCH Publishers, 1993).

Predicting $BC_2N$ Nanotubes and Nanoparticles

FIGS. 1 and 2 show two possible crystalline arrangements of boron, carbon, and nitrogen that yield stable geometries based on tight binding (TB) calculations, local density approximation (LDA), and bond energies. It is important to note that simplifying assumptions were made in order to perform the calculations. The actual nanotubes and nanoparticles that were fabricated, essentially comprised the structure predicted by the theoretical model, and contain in addition some modifications in the form of naturally occurring imperfections. The FIGS. 1 and 2 show each atom having three $sp^2$ bonds to three other atoms; the bond angles are approximately 120°.

In FIG. 1, the bond angles are all 120°. In FIG. 2, the bond angles deviate from 120° by as much as ±2°. The atomic arrangement shown in FIG. 1 is metallic, having a total energy of 0.13 eV/atom more than the atomic arrangement shown in FIG. 2. The atomic arrangement shown in FIG. 2 is semiconducting.

The arrangement shown in FIG. 1 is sometimes referred to as a "type I" sheet and the arrangement shown in FIG. 2 is sometimes referred to as a "type II" sheet (A. Y. Liu et al., Phys. Rev. B 39:1760, 1988).

The lattice vectors, $A_1$ and $A_2$, shown in FIGS. 1 and 2 are constant, thus the half integers are used for the lattice indices (n,m), as noted at the center of each unit cell.

Models of the tubule structures were obtained by rolling either type-I or type-II sheets and classifying them by lattice indices (n,m). In contrast to a material made of carbon only, like graphite, unit cells of boron, carbon, and nitrogen ($B_xC_yN_z$) sheets are comprised of eight atoms, for example, four carbons, two borons, and two nitrogens ($B_2C_4N_2$). The lattice indices noted in FIGS. 1 and 2 uniquely describe the way these sheets can be rolled into tubes.

Examples of tubes where n=m=4 are shown in FIGS. 3 and 4. FIG. 3 shows a (4,4) tube formed from a type-I sheet. FIG. 4 shows a (4,4) tube formed from a type-II sheet. The hexagonal pattern does not exhibit helicity in either FIG. 3 or 4, but the arrangement of atoms do form a helical pattern around the tube. Examination of FIGS. 3 and 4 reveals that different patterns of B, C, and N in the planar sheet yield, when rolled, differing types of atomic helicity even when the hexagonal lattice does not show helicity.

The separation of 'atomic helicity' from 'lattice helicity' is starkly different from nanotubes made essentially from only carbon (see co-pending application Ser. No. 08/792, 461). In addition, the diameter of a nanotube made from boron, carbon, and nitrogen is almost twice that of a nanotube made from only carbon. The anisotropy of the shown $BC_2N$ nanotubes result in an anisotropic electrical conductivity in the in-plane (or along the tube surface) directions. When nanotubes have atomic helicity, the most electrically conducting directions follow the atomic helicity. These tubes thus exhibit electrical properties of nanoscale coils.

In the discussion that follows, (n,m) nanotubes rolled from type-I sheets are referred to as type-I (n,m) tubules. Similarly, (n,m) nanotubes rolled from type-II sheets are referred to as type-II (n,m) tubules.

The present invention is not limited to type-I and type-II geometries. But because those two geometries were the most energetically stable ones found, they provide attractive examples to illustrate the invention and to use for reduction to practice.

Total energy and band structure calculations for the type-I (2,2) and type-II (2,2) $BC_2N$ nanotubes were performed assuming that all atomic coordinates on the tubules were unchanged from the sheet geometry. Metallic band structures were found for the type-I (2,2) nanotubes and semiconducting band structures were found for the type-II (2,2) nanotubes (Y. Miyamoto et al., Phys Rev B, 50(7):4976, 1994). Type-I (n,m) nanotubes are expected to be either metal or semiconducting as a function of their helicity, similar to carbon structures (see co-pending application Ser. No. 08/792,461).

In contrast, type-II (n,m) nanotubes' semiconducting properties are expected to be independent of helicity. Either p-type or n-type semiconductors are obtained by controlling the atomic stoichiometry of the sample. For example, a composition of $B_{1-\partial}C_{2+\partial}N$, which has C impurities on B sites, results in electron carriers. A composition of $BC_{2+\partial}N_{I-\partial}$ has C impurities on N sites which results in hole carriers. Since the sheets, from which the tubes are formed, have anisotropic conductivity in the in-plane directions, both p-type and n-type helical tubes are helical conductors. When metal atoms having magnetic moment are put inside the helical tubes they are strongly affected by the magnetic field of the nanotube. Additionally, the position of the metal atoms can be manipulated within the tube to affect the electronic properties of the tubes. Tubes containing metal atoms with magnetic moments could be used for molecular switches, and other circuit elements such as inductance devices, inductors, memory elements, and information storage devices.

Predicting $BC_3$ Nanotubes and Nanoparticles

Miyamoto et al. predicted tubule forms of $BC_3$ in a Phys Rev B paper, vol. 50, pg. 18360, December 1994. Using local-density-approximation (LDA) and tight-binding (TB) calculations, two-dimensional arrangements of boron and carbon were modeled and rolled to formed tubules. Because $BC_3$ nanotubes and nanoparticles have both $\pi$ and $\pi^*$ bands above the Fermi energy ($E_F$) they can be distinguished from other stoichiometries with EELS measurements. Concentric $BC_3$ nanotubes were predicted to be metallic and single-walled tubes were predicted to be semiconducting.

Synthesizing $BC_2N$ and $BC_3$ Nanotubes and Nanoparticles

Synthesis of $BC_2N$ nanotubes were carried out in accordance with methods and instruments described in copending application "Apparatus for making nanotubes and nanoparticles", Ser. No. 08/978,437, incorporated herein by reference. It is also described in a journal article co-authored by the inventors (Weng-Sieh et al., Phys Rev B, 51(16): 11229, 1995), incorporated herein by reference.

Anode rods of different structure and B-C-N composition were prepared and subsequently arced against pure graphite cathodes. A number of anode-type, arc current, and helium pressure combinations were investigated. $BC_2N$ nanotubes and $BC_3$ nanotubes were produced using a high purity graphite rod (about 0.250-in. diameter) that was center drilled to slip-fit a high-purity, hot-pressed BN rod (about 0.125-in. diameter) inside. This composite rod was arced next to a larger (about 0.750-in diameter) graphite cathode at low current (30–40 A dc) in a relatively high-pressure helium environment of 650 Torr. The arc gap was maintained as close as possible without extinguishing the arc (gap typically less than 1 mm). A cathodic deposit formed with a diameter of approximately 0.375 in. The deposit did not have a soft inner core and hard outer sheath. The deposit easily scratched glass and was somewhat dense along the central axis. Transmission electron microscopy (TEM) and electron energy loss spectroscopy (EELS) studies were conducted on the inner region of the cathodic deposit.

TEM images showed multi-wall, concentric and crystalline nanoparticles and nanotubes, having diameters between about 10 nm and about 0.1 μm and lengths between about 0.1 and about 0.3 μm. Some of the nanotubes exhibited tapered, needle-like tips and others had distinctively capped blunt ends.

EELS analysis was used to determine the stoichiometry of the nanotubes, which was found to be $BC_3$ and $BC_2N$, (Weng-Sieh et al., Phys Rev B, 51(16):11229, 1995), incorporated herein by reference.

Predicting BN Nanotubes and Nanoparticles

A. Rubio et al predicted the existence of nanotubes made of a one-to-one ratio of boron and nitrogen (Phys Rev B, 49(7): 5081, 2/1994-I). Their predictions were based on TB and LDA calculations. Based on the TB calculation, all the BN nanotubes were predicted to be semiconducting. Nanotubes having radii larger than about 6 Å were calculated to be wide band-gap semiconductors in which the electronic properties have only small dependence on tube helicity. The predicted crystalline BN nanotubes and nanoparticles had perfect molecular integrity and large sections of the tube could be considered to be a single crystal.

Synthesizing BN Nanotubes and Nanoparticles

Multiwalled crystalline BN nanotubes and nanoparticles were successfully synthesized in a plasma arc discharge apparatus. To avoid the possibility of carbon contamination, no graphite components were used in the synthesis. The insulating nature of bulk BN prevents the use of a pure BN electrode. This may be why Hamilton et al. (Ibid.) used a high temperature gas reaction to make amorphous micron-scale BN tubes. The inventive crystalline nano-scale tubes and particles were made using a compound electrode that was formed by inserting an about 3.17 mm diameter pressed rod of crystalline hexagonal BN into a hollow tungsten electrode having an outer diameter of about 6.3 mm. The cathode comprised a rapidly cooled pure copper electrode. During discharge, the environmental helium gas was maintained at about 650 Torr and the dc current was ramped from about 50 to about 140 A, so that a constant potential drop of about 30 V was maintained between the electrodes. During arcing, a dark gray soot deposited on the copper cathode. After the arcing was complete, pieces of solidified tungsten were found spattered inside the chamber, indicating that the temperature at the anode during synthesis exceeded 3700 K, the melting point of tungsten.

The cathodic deposit was characterized with transmission electron microscopy (TEM) using a JEOL JEM 200CX electron microscope, having 200-keV accelerating voltage. Portions of the gray soot were deposited onto holey carbon grids and analyzed under phase-contrast imaging conditions.

Numerous Structures of distinct and contrasting morphologies were apparent. Structures were observed that appeared to be multiwalled nanotubes having inner diameters on the order of between about 1 nm and about 3 nm; outer diameters on the order of between about 6 nm and about 8 nm; and lengths varying from about equal to the diameter (i.e. a particle) to more than 200 nm (N. G. Chopra et al, Science, 269: 967, Aug. 18, 1995).

A high resolution TEM image of a portion of an observed nanotube showed sharp lattice fringes indicating that the walls of the nanotubes were well ordered with an interlayer distance of about 3.3 Å, which is consistent with the interplanar distance of 3.33 Å in bulk crystalline, hexagonal BN. Multi-walled tubes were observed having seven, eight, or nine walls.

The ends of BN nanotubes revealed an interesting feature. Every end that was observed contained a dense particle, possibly tungsten or a tungsten compound additionally comprising boron and/or nitrogen. The diameter of the dense particle was similar to the outer BN nanotube diameter.

EELS was used to determine the stoichiometry of individual nanotubes. Two distinct absorption features were revealed in the EELS spectrum, one beginning at 188 eV and another at 401 eV. These energies correspond to the known K-edge onsets for boron and nitrogen, respectively. The fine structure in the spectrum revealed the hexagonal bonding between boron and nitrogen. No K-edge absorption for carbon, which would appear at 284 eV, was observed. Quantitative analysis of the nanotube EELS spectrum gave a B:N ratio of 1.14, which is consistent with a stoichiometry of BN. Thus the earlier predicted nanotubes and nanoparticles comprised of BN are consistent with nanotubes rolled from two-dimensional $sp^2$ bonded hexagonal BN.

Synthesizing CN Nanotubes and Nanoparticles

One of the theoretically predicted groups of structures from the group comprising $B_xC_yN_z$, where x, y, and z are integers, are those in which x=0, for example, CN. The inventive apparatus disclosed in co-pending application Ser. No. 08/978,437, was used to synthesize nanotubes and particles composed of CN. A number of different electrode types, arc currents, and gas pressure configurations give favorable results.

Carbon and nitrogen is introduced into the arc chamber by using a composite anode, comprised of a conducting material combined with carbon and nitrogen. As an alternative method, gases containing at least one of the elements from the group comprising nitrogen and carbon, are injected through conduits into the arc region to assist in production of nanoparticles and nanotubes having diameters on the order of nanometers, and based on compounds of $C_yN_z$. The injected gases are used as a supplement to, or in lieu of, the $C_yN_z$ component of the anode.

The total pressure in the chamber was kept at about 500 torr, that is the partial pressure of nitrogen, $P_{N2}$, and the partial pressure of helium $P_{He}$, was about 500 torr. About 100 amps was passed through an anode comprising a section of ¼ inch carbon.

Uses of BN:

The inventive BN nanotube material has several important useful properties. Because it is always semiconducting with a large band gap, it acts like an insulator to electromagnetic detection devices. Thus coating an item with the inventive BN nanotube and nanoparticle material would render the item invisible to electronic measuring devices, such as radar. At the same time, the inventive material has high mechanical strength. The Young's Modulus of the inventive material is in the range of about 1300 Gpa. Its high mechanical strength makes the inventive BN material important as an additive to other materials. For example, additives are strengthened by addition of the inventive high strength fibers formed from the inventive nanotubes.

BN nanotubes can be doped with other materials to change their conduction properties. For example, 1% addition of carbon to the BN formula causes increased electrical conductivity that is proportional to the dopant concentration. This occurs in a manner that is analogous to conventional semiconductor doping.

An interesting attribute of conducting BN nanotubes is that the carriers are predicted to move predominantly along a nanotube's interior core rather than along the outer surface of the nanotube.

Uses of $BC_2N$:

Nanotubes made from $BC_2N$ always comprise a helical structure, either in terms of unit cells of the crystal or in an atomic sense (see discussion above). Thus nanotubes made from $BC_2N$ are useful as electrical coils. In nanocircuits $BC_2N$ nanotubes provide the inductance element.

Uses of $BC_3$:

Individual nanotubes made of $BC_3$ are semiconducting. However if $BC_3$ nanotubes are brought within a few angstroms of one another, they become metallic and electrically conducting. Thus, the nanotubes are useful as position sensors and as stress sensors. For example, the nanotubes placed a certain distance apart would become conducting when enough force was applied to compress them, or the material in which the nanotubes resided, to within angstroms of one another. Similarly, loss of conductance indicates that the material has expanded, for example from application of heat. Additionally, conductance of the nanotubes becomes a useful parameter for micro positioning.

Uses of CN:

The inventive CN nanotube material has several important useful properties. It behaves similarly to BN and because it is typically semiconducting with a large band gap, it acts like an insulator to electromagnetic detection devices. Thus coating an item with the inventive CN nanotube and nanoparticle material would render the item invisible to electronic measuring devices, such as radar. At the same time, the inventive material has high mechanical strength. Its high mechanical strength makes the inventive CN material important as an additive to other materials. For example, additives are strengthened by addition of the inventive high strength fibers formed from the inventive nanotubes.

CN nanotubes can be doped with other materials to change their conduction properties. For example, 1% addition of carbon to the BN formula causes increased electrical conductivity that is proportional to the dopant concentration. This occurs in a manner that is analogous to conventional semiconductor doping.

All of the nanotubes described in this document are useful in field emission devices as described in copending application Ser. No. 08/884,450, incorporated by reference herein.

Nanoparticles:

Nanoparticles of the above inventive materials form during the same process that forms nanotubes. Particles, as distinct from tubes, are those formations in which there is no discernible long dimension, although there may be an axis of symmetry. In a nanoparticle the length in the direction along the axis of symmetry is approximately the same as the diameter. Nanoparticles are useful in lubricants and in composite materials. The inventive nanoparticles provide a useful additive for wet lubricants, such as transmission oil. In addition, the nanoparticles provide a unique dry lubricant, useful in ultrahigh vacuum environments. The mechanical properties of composite materials can be changed by additions of nanoparticles. The nanoparticles fill microscopic cracks in the material imparting strength and hardness to the material.

Thus, inventive nanotubes and nanoparticles having crystalline walls were synthesized comprising a variety of stoichiometries of $B_xC_yN_z$. Typically x, y, and z are integers including zero, where no more than one of x, y, and z are zero for a given stoichiometry. The nanotubes and nanoparticles can be doped and are useful as miniature electronic components, such as wires, coils, schotky barriers, diodes, inductors, memory elements and other circuit devices and elements. The nanotubes and nanoparticles are also useful as a coating to protect an item from detection by electromagnetic monitoring techniques like radar. The nanotubes and nanoparticles are additionally useful for their mechanical properties, being comparable in strength and stiffness to the best graphite fibers or carbon nanotubes. The inventive nanoparticles are useful in lubricants and composites.

The description of illustrative embodiments and best modes of the present invention is not intended to limit the scope of the invention. Various modifications, alternative constructions and equivalents may be employed without departing from the true spirit and scope of the appended claims.

Having thus described the invention, what is claimed is:

1. A nanotube comprising a crystalline structure of $B_xC_yN_z$, where x, y, and z indicate a relative amount of each element compared to the others and where no more than one of x, y, or z are zero for a single stoichiometry; and where x:y:z is selected from the group consisting of about 1:2:1, about 1:3:0, about 1:0:1, and about 0:1:1.

2. The nanotube of claim 1 wherein x, y, and z are integers.

3. The nanotube of claim 1 wherein the ratio of boron: carbon;nitrogen is about 1:2:1.

4. The nanotube of claim 3 further comprising dopant material.

5. The nanotube of claim 1 wherein the ratio of boron: carbon:nitrogen is about 1:3:0.

6. The nanotube of claim 5 further comprising dopant material.

7. The nanotube of claim 1 wherein the ratio of boron: carbon:nitrogen is about 1:0:1.

8. The nanotube of claim 7 further comprising dopant material.

9. The nanotube of claim 1 wherein the ratio of boron: carbon:nitrogen is about 0:1:1.

10. The nanotube of claim 9 further comprising dopant material.

11. A field emission device wherein the field emitters are comprised of nanotubes according to claim 1.

12. A composite material comprising nanotubes according to claim 1.

13. A nanotube comprising a crystalline structure of $B_xC_yN_z$, where x, y, and z indicate a relative amount of each element compared to the others and where no more than one of x, y, or z are zero for a single stoichiometry; where x:y:z is selected from the group consisting of about 1:2:1, about 1:3:0, about 1:0:1, and about 0:1:1; and further comprising dopant material.

14. A coating to hide objects from radar comprising electrically insulating nanotubes and nanoparticles wherein the nanotubes and nanoparticles are essentially comprised of boron and nitride in a ratio of about 1:1.

15. The coating of claim 14 wherein the nanotubes and nanoparticles further comprise dopant material.

16. A nanoscale inductance element comprising boron, carbon, and nitrogen nanotubes wherein the elements are present in a ratio of about 1:2:1.

17. The inductance element of claim 16 further comprising dopant material.

18. The inductance element of claim 16 further comprising a metal atom inside the nanotube.

19. A position sensor comprising boron and carbon nanotubes wherein the elements are present in a ratio of about 1:3.

20. A stress sensor comprising boron and carbon nanotubes wherein the elements are present in a ratio of about 1:3.

21. A temperature sensor comprising boron and carbon nanotubes wherein the elements are present in a ratio of about 1:3.

22. A nanoparticle comprising a crystalline structure of $B_xC_yN_z$, where x, y, and z indicate a relative amount of each element compared to the others and where no more than one of x, y, or z are zero for a single stoichiometry; and where x:y:z is selected from the group consisting of about 1:2:1, about 1:3:0, about 1:0:1, and about 0:1:1.

23. The nanoparticle of claim 22 wherein x, y, and z are integers.

24. The nanoparticle of claim 23 where in the ratio of boron:carbon:nitrogen is about 1:2:1.

25. The nanoparticle of claim 22 further comprising dopant material.

26. The nanoparticle of claim 22 where in the ratio of boron:carbon:nitrogen is about 1:3:0.

27. The nanoparticle of claim 26 further comprising dopant material.

28. The nanoparticle of claim 22 wherein the ratio of boron:carbon:nitroqen is about 1:0:1.

29. The nanoparticle of claim 28 further comprising dopant material.

30. The nanoparticle of claim 22 where in the ratio of boron:carbon:nitrogen is about 0:1:1.

31. The nanoparticle of claim 30 further comprising dopant material.

32. A dry lubricant comprising nanoparticles according to claim 22.

33. An additive for wet lubricants comprising nanoparticles according to claim 22.

34. A material to fill microscopic cracks in composite materials comprising nanoparticles according to claim 22.

35. An additive to composite materials comprising nanoparticles according to claim 22.

36. The additive of claim 35 wherein the nanoparticles increase the strength of the composite material.

* * * * *